US008658230B2

(12) United States Patent
Tuot et al.

(10) Patent No.: US 8,658,230 B2
(45) Date of Patent: *Feb. 25, 2014

(54) OIL-FREE SHELF STABLE LIQUID CREAMERS

(75) Inventors: James Tuot, Dublin, OH (US); Winnie Octavia, Delaware, OH (US); Alexander A. Sher, Dublin, OH (US)

(73) Assignee: Nestec S.A., Vevey (CH)

( * ) Notice: Subject to any disclaimer, the term of this patent is extended or adjusted under 35 U.S.C. 154(b) by 195 days.

This patent is subject to a terminal disclaimer.

(21) Appl. No.: 13/126,393

(22) PCT Filed: Oct. 26, 2009

(86) PCT No.: PCT/EP2009/064048
§ 371 (c)(1),
(2), (4) Date: Apr. 27, 2011

(87) PCT Pub. No.: WO2010/049376
PCT Pub. Date: May 6, 2010

(65) Prior Publication Data
US 2011/0206815 A1    Aug. 25, 2011

Related U.S. Application Data

(60) Provisional application No. 61/108,814, filed on Oct. 27, 2008.

(51) Int. Cl.
*A23L 3/34* (2006.01)
(52) U.S. Cl.
USPC .............................. 426/322; 426/573; 426/575
(58) Field of Classification Search
USPC ........................ 426/321, 322, 573, 575, 658
See application file for complete search history.

(56) References Cited

U.S. PATENT DOCUMENTS

| 3,579,356 | A | 5/1971 | Miller et al. |
| 3,935,325 | A | 1/1976 | Gilmore et al. |
| 4,748,028 | A | 5/1988 | McKenna et al. |
| 5,643,627 | A | 7/1997 | Huang et al. |
| 6,020,017 | A | 2/2000 | Mingtone |
| 6,824,810 | B2 * | 11/2004 | Sargent et al. ................. 426/588 |
| 2009/0142468 | A1 | 6/2009 | Sher |
| 2009/0142469 | A1 | 6/2009 | Sher |

FOREIGN PATENT DOCUMENTS

| EP | 0457002 | 11/1991 |
| EP | 0616778 | 9/1994 |
| WO | 95/27004 | 10/1995 |
| WO | 03/003850 | 1/2003 |

OTHER PUBLICATIONS

International Search Report—PCT/EP2009/064048—mailed Feb. 24, 2010, 6 pages.

* cited by examiner

*Primary Examiner* — Leslie Wong
(74) *Attorney, Agent, or Firm* — K&L Gates LLP

(57) ABSTRACT

An oil-free, non-dairy, shelf-stable liquid whitening composition having a whitening agent and a stabilizing system is disclosed. The stabilizing system includes a hydrocolloid component, preferably of a blend of microcrystalline cellulose (MCC), carboxymethylcellulose (CMC) and carrageenans, in an amount sufficient to suspend the whitening agent both in the liquid whitening composition and in an aqueous media to which the liquid whitening composition is added; and a buffer to ensure sensory quality. The stabilizing system maintains the liquid whitening composition in a homogeneous state in the composition for at least about 9 months at ambient temperatures, and further maintains the whitening composition in suspension when added to the aqueous media.

19 Claims, No Drawings

OIL-FREE SHELF STABLE LIQUID CREAMERS

This application is a 371 of PCT/EP09/64048, filed Oct. 26, 2009.

FIELD OF INVENTION

The present invention relates to an oil-free liquid whitening composition for use in foodstuffs. More particularly, the embodiments of the invention relate to an aseptically packaged, oil-free, non-dairy, shelf-stable liquid coffee whitener, and the process of making same.

BACKGROUND OF THE INVENTION

Coffee whiteners can be in liquid or powder forms. Powdered forms tend to be less able to simulate the qualities of traditional dairy creamers, such as color, body and texture, and often fail to achieve complete dissolution.

Liquid whiteners are used widely in homes, offices, restaurants, workplaces, and other establishments to whiten and flavor beverages such as coffee and tea, and the market for non-dairy creamers that provide a whitening quality is rapidly growing. The United States is the market leader for this type of product.

Unfortunately, liquid dairy creamers tend to deteriorate rapidly, even when stored at refrigeration temperatures. One possible solution is to use a non-dairy whitener, but this introduces new challenges of creating a product that mimics the feeling of dairy, while offering the desired stability. Specific stability concerns include the ability to maintain a homogeneous product without separation or sedimentation of components during storage at room temperature and elevated temperatures for several months.

Current consumer trends demonstrate increased consumption of reduced-fat and fat-free products, including dairy products such as creamers. Fat present in creamers typically takes the form of trans-fatty acids, and/or saturated fat, which, in accordance with health guidelines, consumers are reducing or eliminating consumption. Fat present in creamers is typically emulsified into fine oil droplets of about 0.2 to 1 micron in diameter resulting in the whitening power created by light scattering by these tiny particles. Since fat/oil emulsions provide a whitening quality, the removal thereof requires an increase in whitening capability of the creamer. This can be achieved by the addition of more of a whitening component, but it is difficult to maintain the whitening component in suspension. Therefore, it is difficult to provide fat-free, or even low fat, whiteners, without diminishing their whitening capacity as compared to conventional full-fat products, and further without compromising stability. Fat also provides flavor and body, so it is a further challenge to prepare a fat-free or reduced-fat whitener that maintains the same satisfaction as a full-fat product.

A desired whitener should be stable physically during storage and retain a constant viscosity over time. When added to coffee or similar beverages, the product should provide a good whitening capacity, dissolve rapidly and remain stable in a hot acidic environment with no separation of components, e.g., no marbling, serum separation, or sedimentation.

U.S. Pat. No. 3,935,325 describes a freeze-thaw stable coffee whitener. The disclosed coffee whitener is made with water, vegetable fat, vegetable protein, carbohydrates, buffering salt, emulsifiers and other ingredients. Such whiteners are inconvenient due to the need to thaw the product prior to use, and are high in cost due to handling and storage requirements.

European Patent Application No. 0 457 002 describes a liquid coffee whitener composed of fat or oil, water, carbohydrate and an amount of a protein hydrolysate effective to provide a stable emulsion. However, this coffee whitener is not shelf-stable.

U.S. Pat. No. 4,748,028 discloses an aseptic fluid coffee whitener and process for preparing the same. The process includes ultra-high temperature (UHT) sterilization of a mixture of water, vegetable fat, emulsifiers, a milk protein, salt and other ingredients, cooling, homogenizing and cooling the mixture, and filling the resulting liquid in an aseptic container under aseptic conditions. The main disadvantage of the coffee whiteners disclosed by the patent is the high level of fat in the creamer, and the insufficient whitening power of the reduced-fat version of the creamer.

Thus, there is a need for a liquid shelf-stable whitener, especially fat-free and low-fat, which has a high whitening capacity, good physical and chemical stability throughout the duration of its shelf-life, without creaming, sedimentation, or altered flavor. The whitener must also have suitable viscosity and pleasant mouth-feel, without phase separation when added to beverages such as coffee.

The present invention provides a oil-free whitener having the qualities set forth above, and therefore satisfies a need in the art.

SUMMARY OF THE INVENTION

The present invention relates to an oil-free, non-dairy, shelf-stable, liquid whitening composition (also referred to herein as a beverage whitener or a creamer) that includes a whitening agent and a stabilizing system to maintain the liquid whitening composition in a homogenous state in the composition for at least about 9 months at ambient temperatures. The stabilizing system includes a hydrocolloid component, preferably of a blend of microcrystalline cellulose (MCC), carboxymethylcellulose (CMC), and carrageenans, in an amount sufficient to suspend the whitening agent both in the liquid whitening composition and in aqueous media to which the liquid whitening composition is added. If desired, a buffer may be added to ensure stability and sensory quality.

In one embodiment of the invention, the whitening agent is titanium dioxide. Titanium dioxide can be present in an amount of about 0.05 to about 1 percent by weight of the composition, and can have a mean particle size of about 0.2 to about 0.4 microns, preferably about 0.3 microns.

It was surprisingly found that addition of a combination of MCC and CMC at an amount of about 0.05 to about 1 percent by weight of the composition resulted in significant improvement of titanium dioxide suspension stability. In one embodiment, the MCC/CMC blend has a weight ratio of MCC to CMC of about 3:1 to about 30:1.

Advantageously and unexpectedly, the MCC and CMC combination provides additional improved enhancements and functionality in certain combinations with carrageenans. While different combinations of kappa-, iota-, and lambda-carrageenans may be used, it is preferred to use a mixture of kappa- and iota-carrageenan, present in an amount of about 0.005 to about 0.6 percent by weight of the total whitening composition. A suitable weight-to-weight ratio of kappa to iota carageenan is about 10:1 to about 1:15.

It was further surprisingly found that the use of the defined combinations of titanium dioxide, MCC, CMC, and kappa- and iota-carrageenan maintained the physico-chemical stability of the UHT treated and aseptically filled liquid coffee whiteners, and did not affect the whitener viscosity during nine months storage at room temperature.

In one embodiment, the whitening composition of the invention has a total solid content between about 5 to about 65 percent by weight of the total composition. The whiteners can also include added colors and/or flavors.

The invention also relates to the use of a stabilizing system of the types described herein to prepare an oil-free, non-dairy, shelf-stable liquid whitening composition that includes a whitening agent, wherein the stabilizing system includes a hydrocolloid component in an amount sufficient to suspend the whitening agent both in the liquid whitening composition and in aqueous media to which the liquid whitening composition is added; wherein the stabilizing system maintains the liquid whitening composition in a homogeneous state in the composition for at least about 9 months at ambient temperatures, and further wherein the stabilizing system provides for suspension and emulsion of the whitening composition in the aqueous media.

The invention further relates to a beverage made of water, a beverage-forming component and a sufficient amount of the whitening composition set forth herein to provide whitening to the beverage. The beverage forming component can be coffee, tea, chocolate or a fruit drink.

Embodiments of the invention are also directed to a process of preparing an oil-free, non-dairy, shelf-stable liquid coffee whitener. The process includes providing a powdered form of the whitening agent and stabilizing system components of the whitening composition set forth herein, suspending the powdered whitening agent and suspending/dissolving stabilizing components in hot (70 to 95° C.) water under agitation to form a mixture, sterilizing the mixture using ultra-high temperature (UHT) treatment, homogenizing the mixture, and cooling the mixture under aseptic conditions. Homogenization can be performed before or after UHT treatment or both, as desired.

Though the present invention discloses the coffee whiteners, use is not limited to coffee applications. For example, the whiteners can also be used for whitening of other beverages, such as tea or cocoa, or used with cereals, as cream for berries, creamers for soups, in many cooking applications, etc.

DETAILED DESCRIPTION OF THE PREFERRED EMBODIMENTS

The present invention is directed to an oil-free, non-dairy, shelf-stable liquid whitening composition comprising a whitening component and a stabilizing system including a hydrocolloid component and a buffer.

The term "oil-free" means that either no oil is present in the whitener of the invention, or that it is present at a drastically reduced amount, and preferably is less than 0.5% by weight of the formulation. Accordingly, the whitener formulations of the present invention can be made without the addition of vegetable or other oils or without the addition of fats. This enhances the ability of the formulations to possess a low-fat or no-fat content such that its use by consumers provides a healthier and less caloric value product.

A liquid creamer must deliver the right white color, an acceptable mouthfeel, and an agreeable flavor. The most difficult aspect of an oil-free whitener is to produce the desirable color. The whitener of the invention includes a whitening component or agent such as an oxide that is suitable for human consumption in the provided amount. In preferred embodiments of the invention, the whitening agent is titanium oxide ($TiO_2$), present in an amount of about 0.05 to about 1 percent, and more preferably about 0.25 to about 0.65 percent by weight of the composition. By using 0.05% to about 1% $TiO_2$ suspended in a liquid creamer, it was confirmed that the whitening power of the creamer of the invention is sufficient to match the whitening power of liquid creamers presently on the market. The 1% level of $TiO_2$ is currently the maximum allowed by the US FDA for addition into a food item. The color delivered by the suspended $TiO_2$ is maximized when the particle size of the $TiO_2$ is optimized. Preferably, the titanium dioxide has a mean particle size of about 0.2 to about 0.4 microns. Most preferably, the titanium dioxide has a mean particle size of about 0.3 microns.

The optimum size of a whitening agent is obtained when light scattering delivers the most intense white color, which, for the whole visible spectrum, is half the average wavelength or around 0.3 microns. A smaller size would make the liquid creamer itself bluish in color, whereas a larger size would progressively decrease the whitening power. All creamers on the market are made with oil or whitening agent with a mean particle size of around 0.4 microns. By using a smaller particle size around a mean of 0.30 microns in the most preferred embodiment of the invention, it would be beneficial in at least two aspects. On the one hand, the increased whitening power would result in less of the whitening agent needed for the same end color. On the other hand, the smaller particles would be easier to suspend and be kept suspended. Generally speaking suspended particles are governed by the Stokes' law terminal velocity in term of gravitational force providing a tendency for settling. However at particle size lower than about 2 microns, other forces become significant and also control the settling or suspension. It is well known that below 2 microns Brownian motion predominates and the gravitational forces becomes less and less important as the size reduces, thus favoring suspension of small particles without much settling. For example, for a solid sphere of density 2000 $kg/m^3$, displacement due to Brownian movement is 43 times larger than displacement due to gravity for 0.25 microns particles whereas the same ratio is only 7.6 and 1.34, respectively, for particles of 0.50 and 1 microns (Basic Principles of Particle Size Analysis, Alan Rawle, Malvern Instruments Limited). This remarkably strong increase in the relative importance of Brownian movement when the particle size is decreased from 0.5 to 0.25 microns is a clear indication of the substantial benefits of using smaller particles around 0.30 microns in mean diameter with a standard deviation as small as possible to minimize the large particles.

A stabilizing system is used in the whitening composition of the invention to stabilize or maintain the whitener in a homogeneous state, such that there is no separation of components, sedimentation, gelation, or changes in viscosity. The stabilizing system maintains the whitener in a homogenous state in the composition at ambient temperatures for at least nine months. This enables the composition to be shelf stable during transport and storage prior to use. Ambient temperatures are typically room temperature and above, but include any environmental temperature at which the whitener is stored. The stabilizing system further helps maintain the whitener in the aqueous media to which the whitener added, such that the whitener exhibits the desired whitening and suspension qualities, and imparts the desired texture to achieve a palatable "mouth-feel".

The stabilizing system of the invention includes a hydrocolloid component which ensures that all $TiO_2$ particles are well dispersed and not agglomerating together in the suspension, and without precipitating over the complete shelf life. Preferably, the hydrocolloid component comprises a blend of Carboxymethylcellulose (CMC), microcrystalline cellulose (MCC), and carrageenans. As an example, FMC Corporation sells such co-processed blends under the trade name of Avicel, and some FMC Avicel have been found suitable for the invention, although hydrocolloids from other suppliers can also be used.

Preferably, a combination of different carrageenans, such as kappa, lambda, or iota carrageenan, is used to help maintain the whitening agent in suspension, and also to help to maintain the whitener in aqueous media or beverage to which the whitener is added. More preferably, a combination of two different carrageenans is used at an amount from about 0.005 percent to about 0.6 percent by weight of the total composition of whitener. In a further preferred embodiment, a combination of kappa and iota carrageenans is used, with the kappa carrageenan being present at an amount of about 0.005 to about 0.05%, and the weight ratio of kappa to iota carrageenan being about 1:2 to about 1:6.

The combination of kappa- and iota-carrageenan in the disclosed concentrations and ratios along with the combination of MCC and CMC in the disclosed concentrations and ratios resulted in the best stability of the titanium dioxide suspension. In comparison, if only a combination of carrageenans was added to the whitener to achieve the desired product viscosity, no improvement in suspension stability was observed. Furthermore, if only one type of carrageenan, kappa or iota, was added to the whitener to obtain the desired product viscosity, no improvement in suspension stability was observed. Thus, the invention requires the combination of two different carrageenans, together with CMC and MCC for best performance In a preferred embodiment of the invention, MCC and CMC are present in an amount of about 0.1 to about 1 percent by weight of the composition. In other preferred embodiments, the MCC/CMC is present in an amount of about 0.2 to 0.6 percent by weight of the composition, and in a particularly preferred embodiment, the MCC/CMC blend is present in an about of about 0.3 to about 0.5 percent by weight of the composition. The weight to weight ratio of MCC to CMC can vary from about 3:1 to about 30:1, preferably from 8:1 to 12:1, and most preferably from 9:1 to 10:1. A ratio of less than 3:1 can cause a significant increase in $TiO_2$ sedimentation, where a ratio above 30:1 can increase $TiO_2$ sedimentation and co-precipitation of MCC.

The whitener of the invention include a pH buffer if desired for any particular formulation. Preferably, the pH range is about 6 to 8 and more preferably about 6.5 to 7.5. Non-limiting examples of suitable buffers are salts such as sodium or potassium phosphates, mono-sodium or mono-potassium phosphates, di-sodium or di-potassium phosphates, sodium or potassium bicarbonate, and combinations thereof. The buffer can be present in an amount of up to about 1% of the total weight of the composition. An amount of 0.05 to 0.75% may be used.

A typical recipe for an oil-free, non-dairy, shelf stable liquid creamer of the invention includes water, sugar, $TiO_2$, an adequate amount of hydrocolloid component to suspend the $TiO_2$ and provide the necessary mouthfeel, and a buffer to stabilize the product and achieve an adequate pH if needed for sensory quality. The creamer of the invention may also include a preservative and, as needed, an acidifying agent to ensure proper functionality of this preservative. When the preservative is present, the liquid creamer is shelf stable not only before opening but also for a limited time after opening, allowing a week or so for consumption without the need to refrigerate after opening.

The liquid whitener of the invention, when combined with a beverage such as coffee, produces a homogeneous beverage with an appealing, light color, good mouth-feel, body, smooth texture, and a pleasant taste with no off-flavors developed during shelf-life/storage. The whitener whitens or lightens liquid beverages by combining the whitener with the beverage at ratio of about 1:3 to 1:10, preferably about 1:5 to 1:7 ratio, and most preferably about 1:6. The use of a buffer system in the liquid whitener ensures good quality even when very hard water is used to prepare the beverage.

The liquid whitener can have a total solid content between about 5 to 65%, preferably about 30-50%, and most preferably about 35-45% by weight of the total composition. When combined with an aqueous beverage such as coffee, the resulting liquid can have a solid content of from about 2-10%, preferably about 4-8%, and most preferably about 5-6% weight of the total composition.

In some embodiments, the whitener includes a sweetener in an amount of about 0.1 to about 50% by weight. The sweetener can be a natural sweetener such as sucrose, or a synthetic sweetener such as sucralose, or a combination thereof. The aqueous media to which the whitener is added can be a beverage such as coffee, tea, a chocolate or cocoa-based drink, or a fruit-based drink The beverage can be hot or cold, and can include natural and/or artificial flavors.

Exemplary whitener compositions in accordance with embodiments of the invention were prepared and tested for stability over time. A titanium dioxide particle size of between 0.2 and 0.4 microns should be suitable depending upon the particular formulation. As a reference point, a commercially available, chilled ESL whitener was used. New formulations prepared in accordance with embodiments of the invention were tested against the reference product.

To ensure that the formulations were able to maintain physical stability over time at varying storage conditions, without gelation and phase separation, while maintaining good viscosity, the formulations were tested for whitening ability, visual appeal, pH, sedimentation, and viscosity. Analyses to assess the presence of these qualities included visual observation of the whitener. Whitening Capacity was determined using a Colorimeter (Model COLORQUEST™ XE™) to determine Color L, a, and b values of the whitener when added to coffee. A METROHM™ (model 632) was used to measure pH of the whiteners, and viscosity was analyzed by TA AR 1000N™ stress rheometer. The formulations were also observed by microscopy, using an Olympus BX51™ microscope. Finally, a value ranging from 1 to 10 was assigned for overall sensory evaluation.

The whitening capacity of the whitening formulations with all components within the preferred range after 3 weeks of storage at 38° C., represented by L (lightness value display high whitening ability). The results also show a marked difference between the reference formulation and new formulations. The similar results of the whitening capacity were found for the formulations after 3 months of storage at 30° C., while the L value of the reference formulation decreased significantly. The whitening ability of the reference formulation was reduced due to the formation of compact sediment that could not be re-suspended in aqueous media, even after shaking. The improved whitening ability of the new formulations can be attributed to the ability to maintain titanium dioxide in suspension.

It also was found an improved whitening ability for the new formulations after 6 and 9 months storage at 20° C., reflected by the same amount of $TiO_2$ remaining in the sample. The reference formulation, however, showed a decreased whitening ability over time, due to sedimentation of $TiO_2$. These findings were also confirmed by measurements of L values of the reference and the new samples. It was determined that the new formulations prepared in accordance with embodiments of the present invention demonstrate superior whitening ability after extended storage at ambient temperature, when compared to the reference value.

Viscosity plays a significant role in particle suspension. Increasing product viscosity positively affected $TiO_2$ suspension. However, an increase in liquid viscosity alone is not sufficient to suspend titanium dioxide. While viscosity is an important factor, the formation of a network in the liquid to assist in suspension of particles is crucial. Moreover, viscosity of the whitener has a practical upper limit.

Thus, for good pouring ability of liquid whitener, viscosity upper limit of 60 cP at temperature of 4° C. was established. Increasing product viscosity by the addition of stabilizers/stabilizing systems should lead to better suspension stability of $TiO_2$; however, it was unexpectedly found that product viscosity is not a main factor governing titanium dioxide suspension.

Embodiments of the invention are also directed to a beverage that includes water, a beverage-forming component, and a sufficient amount of the described whitener herein to provide whitening to the beverage. The beverage forming component can be coffee, tea, chocolate or a fruit drink. The beverage forming component can also be a natural or artificial flavoring component, such as powdered crystals or flavored syrup. The beverage itself can be hot, cold, or room temperature and can include natural and/or artificial flavors.

The present invention is further directed to a process of preparing the whiteners set forth herein. The process includes providing a powder form of the whitening agent and stabilizing system components of the whitening composition set forth herein, suspending the whitening agent and suspending or dissolving stabilizing system components in hot (75 to 90° C.) water under agitation to form a mixture, sterilizing the mixture using a conventional ultra-high temperature (UHT) treatment; homogenizing the mixture before and/or after UHT treatment; and cooling the homogenized mixture under aseptic conditions. The method can further include filling aseptic containers under aseptic conditions with the homogenized combination.

As evidenced by the data provided above, formulations prepared in accordance with the present invention provide a shelf-stable liquid whitener that is homogeneous during the ambient storage for several months without phase separation, gelation and sedimentation. This is a significant improvement over existing whiteners, which must be kept at chilled temperatures. By producing a whitener that does not require refrigeration, transportation and storage costs are significantly reduced. The developed oil-free whiteners provide high whitening capacity, without the decrease in stability over the ambient storage.

The whiteners described herein maintain constant viscosity during storage at ambient temperatures. The whiteners are easily dispersible in coffee and are stable in hot and cold acidic environments without separation of components and sedimentation. Also, when added to a beverage, the whitener provides a good mouth-feel, body, smooth texture, and also a good flavor with no off-taste developed during storage time.

The oil-free, non-dairy, shelf-stable liquid whitener of the invention is advantageous in that it confers health as well as nutritional benefits to the consumer due to the elimination of fat, without sacrificing the organoleptic properties. As an additional benefit, the removal or substantial reduction of oil and fat in the whitener composition of the invention also eliminates or at least reduces all constraints and difficulties associated with the presence of oils or fat in the product. For example, it is well known that all fat based liquid creamers are susceptible to oxidation, which needs to be reduced or eliminated with suitable labels or use of antioxidants or a combination thereof. When oil is drastically reduced or even eliminated, suitable oxygen barrier properties of packaging materials, labels or other means for protection against light induced oxidation, or use of antioxidants or a combination thereof would be considered. When oil is drastically reduced or even eliminated, as in the whitener composition of the invention, the corresponding oil oxidation issue will be substantially decreased or even eliminated. The specific taste due to the presence of fat could be further modulated if needed with added flavors chosen to please consumers.

In the case of drastically reduced oil levels (less than 0.5%), these whitener compositions also comprise emulsifiers for oil emulsion stabilization. The emulsifiers used may be selected from the group consisting of low molecular weight emulsifiers such as monoglycerides, diglycerides, acid esters of monoglycerides, sodium or calcium stearoyl lactylate, lecithin and enzyme modified lecithin, stearyl citrate, fatty acids and their salts, or diacetyl esters of monoglycerides, alone or in combination. The emulsifiers used are not limited to those of a single acyl or fatty acid component, such as on a specific carbon chain length or degree of unsaturation. In a preferred embodiment, the low-molecular weight emulsifier is a monoglyceride or an acid ester of a monoglyceride. In a particularly preferred embodiment, the low molecular weight emulsifier is a combination of one or more monoglycerides and acid esters of thereof. Suitable examples include those sold under the trade name DIMODAN or PANODAN, available from Danisco Ingredients USA, Inc. of New Century, Kans., USA; MYVEROL or ADMUL available from Kerry Bio-Science Inc. Low molecular weight emulsifiers can be present in an amount of about 0.1 to about 1 percent by weight of the total composition.

EXAMPLES

The invention is further defined by reference to the following illustrative, non-limiting examples.

Example 1

5 kg of sucrose were mixed together with 20 g of kappa-carrageenan, 150 g of iota-carrageenan, and 1.5 kg of 10:1 MCC/CMC blend. The dry blend was added into 250 kg of hot water (65-70° C.) under high agitation.

5 kg of sucrose, 1.5 kg of titanium dioxide, 750 g of potassium diphosphate, and 300 g of flavor were blended together. The dry blend was added to the tank of hot water with above stabilizers under agitation, followed by 20 kg of sucrose. The liquid was then UHT treated for 5 sec at 143° C., homogenized at 180/40 bar, cooled and the coffee whitener was aseptically filled into jars, jugs or pouches.

The product was stored during nine months at room temperature. No marbling, phase separation, gelation, sedimentation and practically no viscosity changes were found during the storage. Mouth-feel of coffee with added coffee whitener was judged by six non-trained panelists, which found the product having good mouth-feel, body, smooth texture, and a good flavor without altered flavor or an "off" taste.

Example 2

A coffee whitener was prepared as in Example 1 but using CMC instead of MCC/CMC cellulose component.

The product was stored during 3 months at room temperature. Significant sediment formation was found in the coffee whitener samples during the storage. Further, when added to coffee, a significant decrease of whitening ability as compared to the fresh made coffee whitener was observed.

Example 3

A coffee whitener was prepared as in Example 1 but using Xanthan gum instead of CMC and MCC.

The product was stored during 3 months at room temperature. Sedimentation, phase separation/marbling, and gelation were found in the coffee whitener samples during storage.

Example 4

A coffee whitener was prepared as in Example 1 but using Xanthan gum and Guar gum blend instead of CMC and MCC.

The product was stored during 3 months at room temperature. Sedimentation, phase separation/marbling, and gelation were found in the coffee whitener samples during the storage.

Example 5

A coffee whitener was prepared as in Example 1 but using Guar gum instead of CMC and MCC.

The product was stored during 3 months at room temperature. Titanium dioxide sedimentation was found in the coffee whitener samples during the storage. Moreover, it was not able to re-suspend the sediment by sample shaking. Further, when added to coffee, a significant decrease of whitening ability as compared to the fresh made coffee whitener was observed.

It will be appreciated by one of skill in the art that various modifications and variations of the exemplary embodiments disclosed above may be made without departing from the scope of the invention as defined above and with reference to the appended claims.

What is claimed is:

1. An oil-free, non-dairy, shelf-stable liquid whitening composition comprising:
   titanium dioxide in an amount of about 0.05 to about 1 percent by weight of the whitening composition;
   a stabilizing system comprising a blend of microcrystalline cellulose (MCC), carboxymethylcellulose (CMC) and carrageenans in an amount sufficient to suspend the whitening agent both in the liquid whitening composition and in an aqueous media to which the liquid whitening composition is added, and a total amount of the MCC and CMC is about 0.1 to about 1 percent by weight of the whitening composition;
   the stabilizing system maintains the liquid whitening composition in a homogeneous state in the composition for at least about 9 months at ambient temperatures; and
   the stabilizing system provides for suspension of the whitening composition in the aqueous media.

2. The liquid whitening composition of claim 1, comprising a buffer in an amount and at a pH sufficient to ensure product stability and sensory quality.

3. The liquid whitening composition of claim 1, wherein the titanium dioxide comprises about 0.25 to about 0.65 percent by weight of the composition.

4. The liquid whitening composition of claim 1, wherein the titanium dioxide has a mean particle size of about 0.2 to about 0.4 microns.

5. The liquid whitening composition of claim 1, wherein the MCC and CMC are present in a weight ratio of about 8:1 to about 12:1.

6. The liquid whitening composition of claim 1, wherein the MCC and CMC are present in an amount of about 0.2 to about 0.6 percent by weight of the composition.

7. The liquid whitening composition of claim 1, wherein the MCC and CMC are present in a weight ratio of about 3:1 to about 30:1.

8. The liquid whitening composition of claim 1, wherein the carrageenans are a mixture of kappa and iota carrageenan and comprise about 0.005 to about 0.2 percent by weight of the composition.

9. The liquid whitening composition of claim 8, wherein the weight to weight ratio of kappa to iota carrageenan is about 10:1 to about 1:15.

10. The liquid whitening composition of claim 1, comprising a sweetener comprising about 0.1 to about 50 percent by weight of the composition.

11. The liquid whitening composition of claim 1, wherein the composition has a total solids content of between about 10 to about 65 percent by weight of the composition.

12. The liquid whitening composition of claim 1, wherein the composition comprises a preservative.

13. The liquid whitening composition of claim 1, wherein:
   the titanium dioxide has a particle size of about 0.2 to about 0.4 microns; and
   the MCC and CMC have a weight ratio of about 3:1 to about 30:1, and the carrageenans are a mixture of kappa and iota carrageenan comprising about 0.005 to about 0.2 percent by weight of the composition, with the weight to weight ratio of kappa to iota carrageenan being about 10:1 to about 1:15.

14. A beverage comprising water, a beverage-forming component and a sufficient amount of a whitening composition comprising:
   titanium dioxide in an amount of about 0.05 to about 1 percent by weight of the whitening composition,
   a stabilizing system comprising a blend of microcrystalline cellulose (MCC), carboxymethylcellulose (CMC) and carrageenans in an amount sufficient to suspend the whitening agent both in the liquid whitening composition and in an aqueous media to which the liquid whitening composition is added, a total amount of the MCC and CMC is about 0.1 to about 1 percent by weight of the whitening composition,
   the stabilizing system maintains the liquid whitening composition in a homogeneous state in the composition for at least about 9 months at ambient temperatures, and
   the stabilizing system provides for suspension of the whitening composition in the aqueous media to provide whitening to the beverage.

15. The beverage of claim 14 wherein the beverage forming component is selected from the group consisting of coffee, tea, chocolate and a fruit drink.

16. A process of preparing a whitening composition comprising:
   providing, in powdered form, titanium dioxide in an amount of about 0.05 to about 1 percent by weight of the whitening composition and a blend of microcrystalline cellulose (MCC), carboxymethylcellulose (CMC) and carrageenans, a total amount of the MCC and CMC is about 0.1 to about 1 percent by weight of the whitening composition;
   combining the titanium dioxide and the blend of MCC, CMC and carrageenans in hot water under agitation to form a mixture;
   sterilizing the mixture using ultra-high temperature (UHT) treatment;
   homogenizing the mixture; and
   cooling the mixture and packing under aseptic conditions.

17. The process of claim 16, wherein homogenization occurs before UHT treatment, after UHT treatment, or before and after UHT treatment.

18. A method for preparing a product comprising using a stabilizing system to prepare an oil-free, non-dairy, shelf-stable liquid whitening composition that includes titanium dioxide in an amount of about 0.05 to about 1 percent by weight of the whitening composition, the stabilizing system comprises a blend of microcrystalline cellulose (MCC), carboxymethylcellulose (CMC) and carrageenans in an amount sufficient to suspend the whitening agent both in the liquid whitening composition and in an aqueous media to which the liquid whitening composition is added, wherein the stabilizing system maintains the liquid whitening composition in a homogeneous state in the composition for at least about 9 months at ambient temperatures, and the stabilizing system provides for suspension and emulsion of the whitening composition in the aqueous media, and a total amount of the MCC and CMC is about 0.1 to about 1 percent by weight of the whitening composition.

19. The liquid whitening composition of claim 12 comprising an acidifying agent.

* * * * *